J. Richards,
Edge-Tool Grinder.

Nº 61,955. Patented Feb. 12, 1867.

Witnesses:
Henry Sylvester
Edw. Schofer

Inventor:
John Richards
by
Mason, Fenwick & Lawrence

United States Patent Office.

JOHN RICHARDS, OF COLUMBUS, OHIO.

Letters Patent No. 61,955, dated February 12, 1867.

IMPROVEMENT IN MACHINES FOR GRINDING SAWS.

The Schedule referred to in these Letters Patent and making part of the same.

TO ALL WHOM IT MAY CONCERN:

Be it known that I, JOHN RICHARDS, of Columbus, Franklin county, State of Ohio, have invented a new and useful Machine for Grinding Web Saws; and I do hereby declare that the following is a full, clear, and exact description thereof, reference being had to the accompanying drawings, making a part of this specification, in which—

Similar letters of reference indicate corresponding parts in the several figures.

This invention relates to a machine which is designed for bevelling the blades of web saws, and consists in certain novel devices which are adapted for supporting and gauging the saws in a position for grinding, and for adjusting the saws up to the grindstone, as will be hereinafter described.

To enable others skilled in the art to understand my invention, I will describe its construction and operation.

Figure 1:
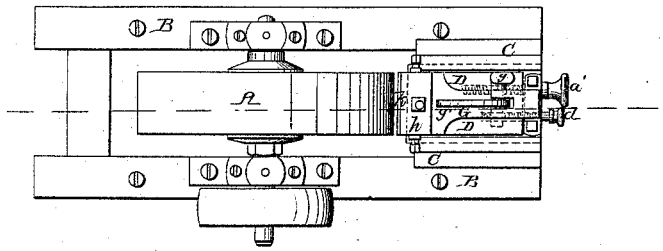
Figure 1 is a top view of the machine.
Figure 2:
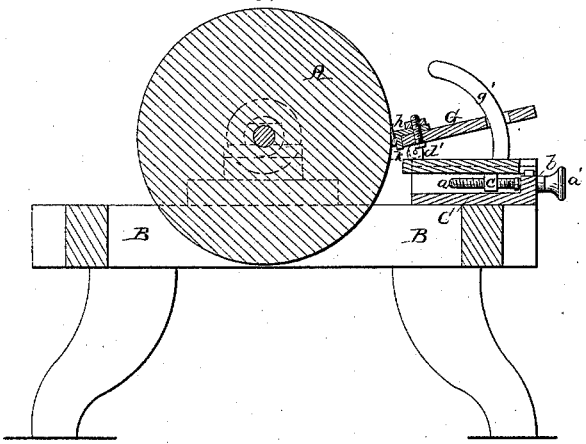
Figure 2 is a longitudinal section, taken vertically through the centre of the machine.
Figure 3:
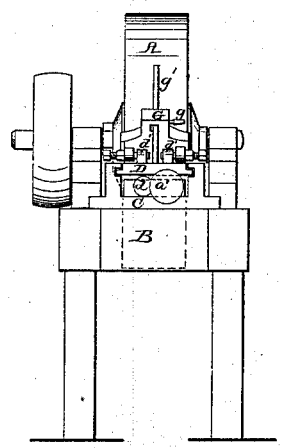
Figure 3 is an elevation of the front of the machine.
Figure 4:
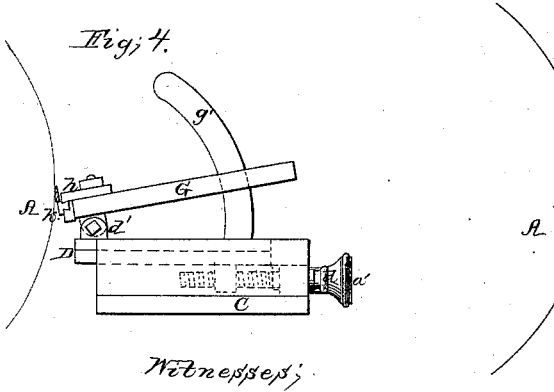
Figures 4 and 5 are views showing the saw supports adjusted at different inclinations for grinding both sides of the saws.
Figure 5:
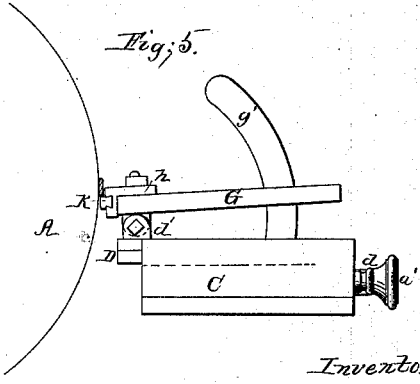

In the accompanying drawings I have represented the grindstone A mounted upon a frame, B, so as to rotate in a vertical plane. On top of this table, near one end, a bed-plate, C, is firmly secured at a suitable distance from the grindstone, for the purpose of supporting and guiding the sliding table D, the longitudinal edges of which are fitted to move in grooves in elevations on said bed-plate, as shown in fig. 3. This adjustable table carries the devices for supporting the saws while being ground, and for adjusting and setting the saws at different inclinations. For moving said table toward and from the grindstone A, a screw, $a$, is used, having a hand-wheel or crank, $a'$, upon one end. This screw-rod passes loosely through the bearing-block $b$ on the bed-plate C, and is tapped through a projection, $c$, of the table D. Alongside of the screw $a$ is a gauge-screw, $d$, by means of which the thickness for grinding the saws can be regulated, and the wear of the grindstone compensated for. On top of the table D, and near that end of it which is next the grindstone, are two short standards, $d'\ d'$, to which the adjustable inclined carrier G is suitably pivoted. The rear end of this carrier is sustained by means of a set-screw, $g$, which secures it to a sector, $g'$, that projects up from table D, and passes through a slot in said carrier, as shown in figs. 1, 2, and 3. By loosening the set-screw $g$, the carrier G can be adjusted at any desired angle with respect to the table D. An angle-plate or guard, $h$, is secured to that end of the carrier G which is nearest the grindstone, and in the end of this plate a hardened steel saw-rest, $k$, is inserted, so as to support the toothed edges of the saw blades while they are being ground.

To operate this machine, the hand-wheel $a'$ is turned back so as to adjust the table or carriage D far enough back to allow the saw to drop between the angle-plate $h$ and the stone A, on the steel guard or rest $k$. The teeth of the saw rest upon guard $k$, with the unground portion of the saw projecting on the side next the operator. The hand-wheel $a'$ is then turned, and the table D moved toward the stone until the gauge-screw prevents any further forward movement of this table. This screw, $d$, is previously adjusted according to the shape required of the saws, so that it will stop the adjustment of the table towards the stone when the work of grinding one side of a saw is complete. As the width of the grindstone only measures a very small part of the length of the saws, the latter are moved in a direction with their length for the purpose of grinding them uniformly. After grinding a number of saws on one side, the pivoted carrier G is raised at its rear end and set at the required inclination for properly presenting the opposite sides of the saws to the grindstone. The object of having the inclined carrier adjustable is to adapt the machine for grinding both sides of a saw equally; also for giving different inclinations to this carrier to adapt it for grinding saws of different sizes and requiring different bevels.

Having described my invention, what I claim as new, and desire to secure by Letters Patent, is—

1. The arrangement, substantially as herein described, whereby saw blades are supported, fed up to the position desired, adjusted at different angles with respect to the face of the carriage D, and bevelled on both sides, all substantially as set forth.

2. The combination of the two screws $a'\ d$ with the sliding carriage D of a saw-bevelling machine, substantially in the manner described.

3. The combination of the shouldered holder $k\ h$, hinged adjustable support G, and curved gauge $g'$, substantially in the manner and for the purpose described.

4. The hard-metal shouldered holder, when constructed to operate as described.

JOHN RICHARDS.

Witnesses:
WM. L. HEYL,
FRANK E. KING.